(12) United States Patent
Abrams et al.

(10) Patent No.: US 10,554,525 B2
(45) Date of Patent: Feb. 4, 2020

(54) TRACKING USAGE OF COMPUTING RESOURCES

(71) Applicant: International Business Machines Corporation, Armonk, NY (US)

(72) Inventors: Robert Abrams, Wappinger Falls, NY (US); Donald W. Schmidt, Stone Ridge, NY (US); Andrew M. Sica, New Haven, CT (US); Horst Sinram, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 15/823,706

(22) Filed: Nov. 28, 2017

(65) Prior Publication Data
US 2019/0166029 A1    May 30, 2019

(51) Int. Cl.
| | | |
|---|---|---|
| G06F 17/30 | (2006.01) | |
| H04L 12/26 | (2006.01) | |
| H04L 29/06 | (2006.01) | |
| H04L 12/911 | (2013.01) | |

(52) U.S. Cl.
CPC ......... *H04L 43/0876* (2013.01); *H04L 47/82* (2013.01); *H04L 63/083* (2013.01)

(58) Field of Classification Search
USPC .......................................................... 726/7
See application file for complete search history.

(56) References Cited

U.S. PATENT DOCUMENTS

| | | | |
|---|---|---|---|
| 7,020,628 B2* | 3/2006 | Peterson ................. | G06F 21/00 705/32 |
| 7,421,412 B2* | 9/2008 | Ramanathan ........... | G06F 21/10 380/201 |
| 7,831,515 B2 | 11/2010 | Martinelli et al. | |
| 8,695,075 B2* | 4/2014 | Anderson ............. | H04L 9/3213 726/8 |
| 9,270,703 B1* | 2/2016 | Clough ................. | H04L 63/107 |
| 9,614,855 B2* | 4/2017 | McClain ............... | H04L 63/102 |
| 9,639,832 B2* | 5/2017 | Heyman ................. | G06F 21/10 |
| 9,774,600 B1* | 9/2017 | Streete .................... | G06F 21/31 |
| 9,853,964 B2* | 12/2017 | Chester .................... | H04L 9/14 |
| 2003/0014315 A1* | 1/2003 | Jaalinoja .............. | G06Q 20/045 705/18 |
| 2003/0177074 A1 | 9/2003 | Ramanathan | |
| 2008/0306786 A1* | 12/2008 | Lonowski ............ | G06Q 10/063 705/7.11 |
| 2011/0107411 A1 | 5/2011 | McClain et al. | |

(Continued)

FOREIGN PATENT DOCUMENTS

CA    2565508 A1    4/2007

*Primary Examiner* — Amare F Tabor
(74) *Attorney, Agent, or Firm* — Cantor Colburn LLP; William Kinnaman (57) ABSTRACT

Systems and methods for tracking computing resources are provided. Aspects include receiving, by a workload manager, a workload, wherein the workload is executable on a customer machine, and wherein the customer machine comprises a plurality of computing resources. The workload is analyzed to determine a workload profile. A token associated with the workload is received and associated with the workload profile. The token is authenticated and the workload is executed based at least in part on authentication of the token.

14 Claims, 6 Drawing Sheets

(56) References Cited

U.S. PATENT DOCUMENTS

2011/0265186 A1* 10/2011 Kwon .................. G06F 21/123
                                                            726/26
2012/0192285 A1    7/2012 Heyman et al.
2018/0300964 A1* 10/2018 Lakshamanan ........ G07C 5/008

* cited by examiner

TRACKING USAGE OF COMPUTING RESOURCES

BACKGROUND

The present invention generally relates to computer resources, and more specifically, to enabling and tracking usage of computing resources.

Software asset management tools are becoming widely used in a variety of computing environments. As described herein, these tools refer to software programs (or sets of software programs) that discover and collect information about software instances deployed in monitored environments. Such a tool may be used by an entity's asset administrator to collect metrics (i.e., measures of properties) about software instances for one or more purposes relating to that entity's financial, regulatory, or licensing requirements. These requirements may incorporate several tasks relating to software license compliance monitoring (e.g., ensuring that all software instances are licensed and metering these software instances to determine the applicable fees that are due to licensors). Furthermore, as software owners continue to shift toward complex software licensing schemes, software asset management tools may continue to play increasingly significant roles.

SUMMARY

Embodiments of the present invention are directed to a computer-implemented method for tracking computing resources. A non-limiting example of the computer-implemented method includes receiving, by a workload manager, a workload, wherein the workload is executable on a customer machine, and wherein the customer machine comprises a plurality of computing resources. The workload is analyzed to determine a workload profile. A token associated with the workload is received and associated with the workload profile. The token is authenticated and the workload is executed based at least in part on authentication of the token.

Embodiments of the present invention are directed to a system for tracking computing resources. A non-limiting example of the system includes a processor coupled to a memory and configured to perform a method including receiving, by a workload manager, a workload, wherein the workload is executable on a customer machine, and wherein the customer machine comprises a plurality of computing resources. The workload is analyzed to determine a workload profile. A token associated with the workload is received and associated with the workload profile. The token is authenticated and the workload is executed based at least in part on authentication of the token.

Embodiments of the invention are directed to a computer program product for tracking computing resources, the computer program product comprising a computer readable storage medium having program instructions embodied therewith. The program instructions are executable by a processor to cause the processor to perform a method. A non-limiting example of the method includes receiving, by a workload manager, a workload, wherein the workload is executable on a customer machine, and wherein the customer machine comprises a plurality of computing resources. The workload is analyzed to determine a workload profile. A token associated with the workload is received and associated with the workload profile. The token is authenticated and the workload is executed based at least in part on authentication of the token.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
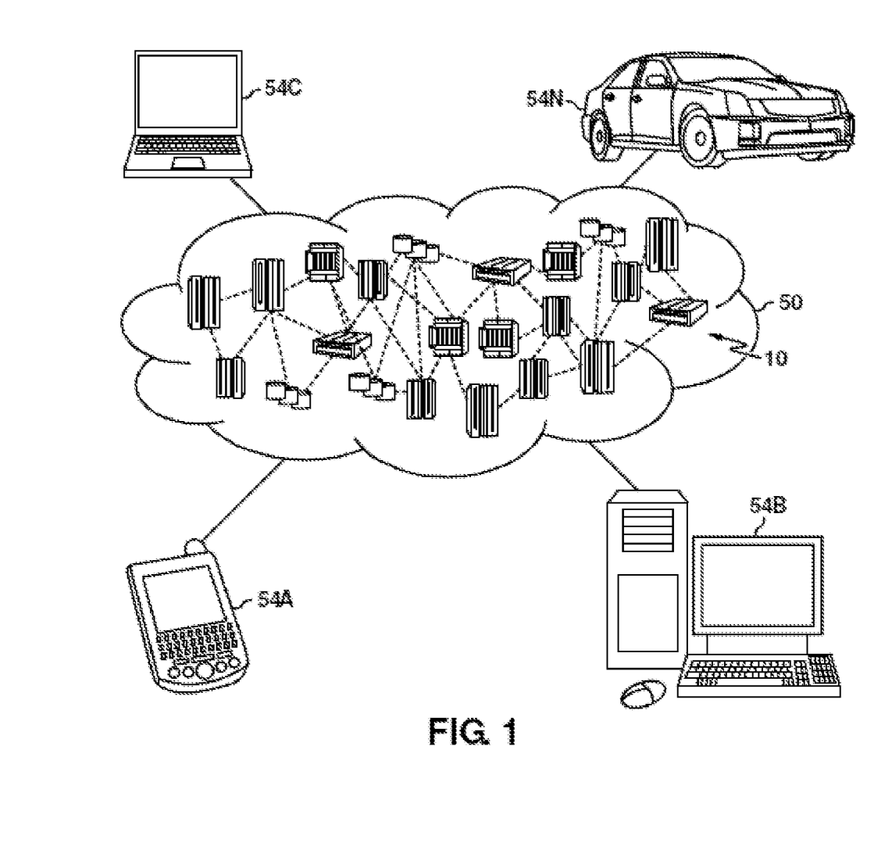
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
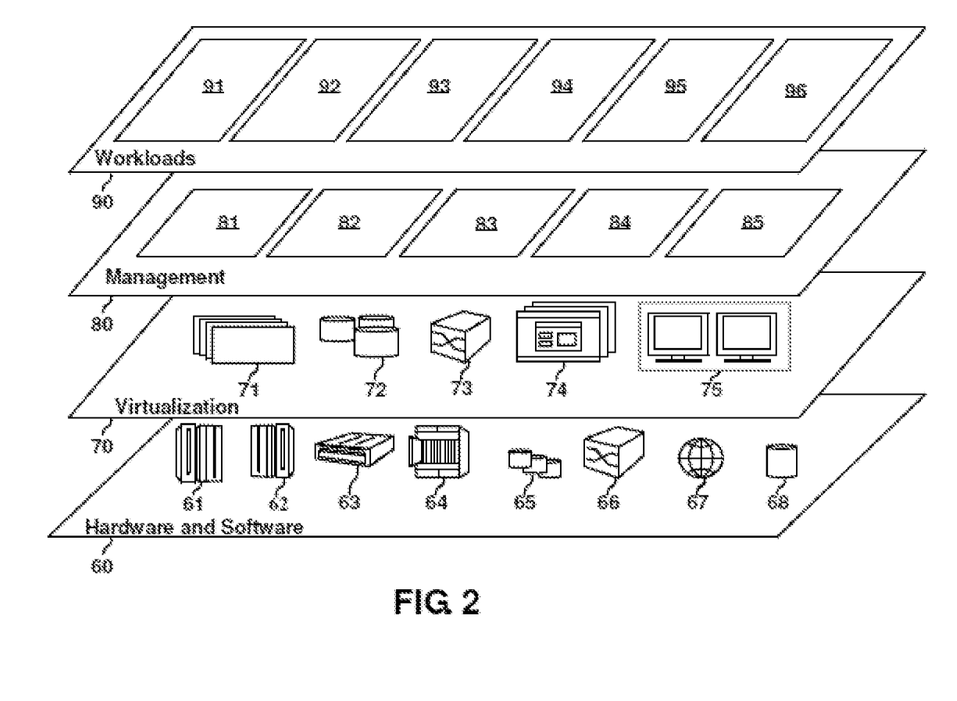
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tracking computing resources 96.

Figure 3:
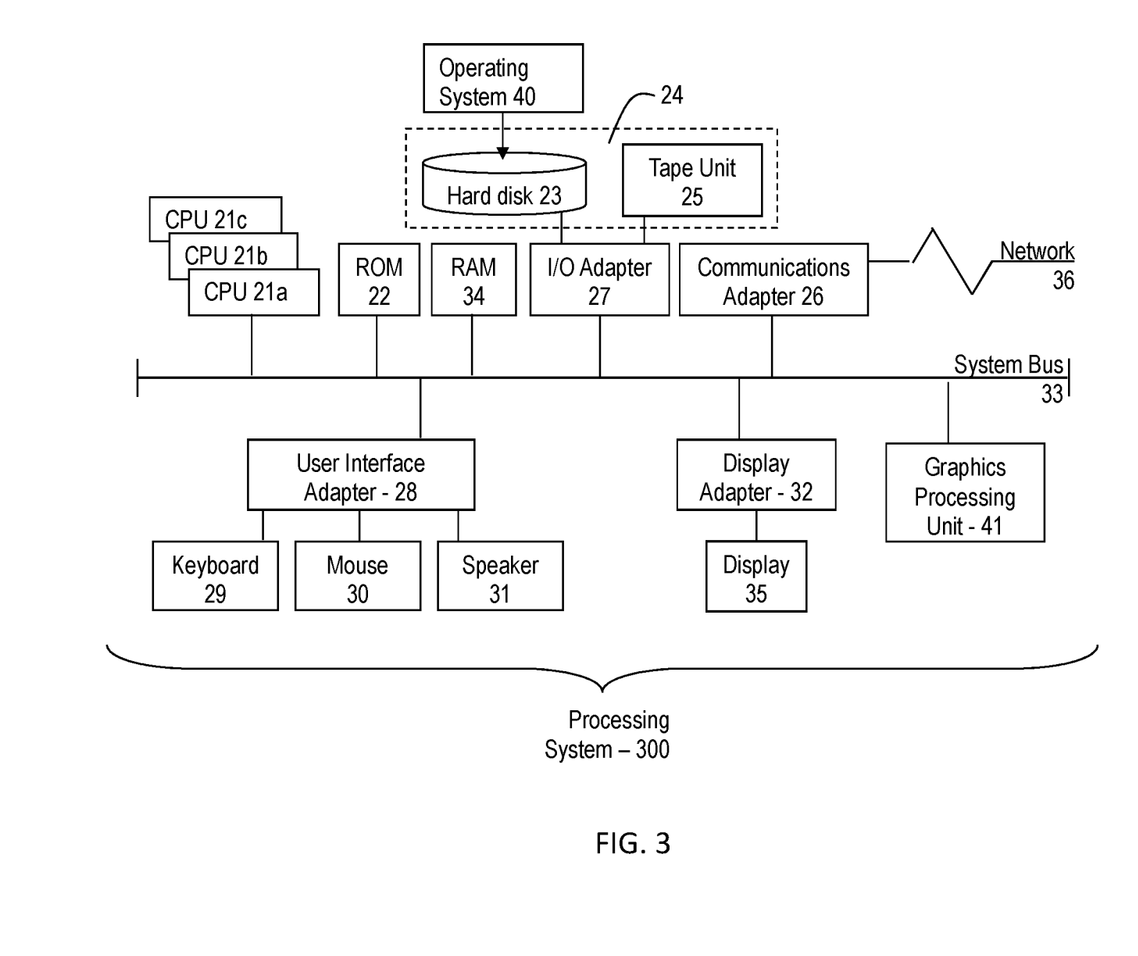
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, software pricing for mainframe computing system typically follow a sub-capacity software licensing scheme. Sub-capacity licensing allows a customer to license an eligible software product for less than the full capacity of the customer's server or group of servers. Other licensing models include a floating (or network) concept, where a specific number of licenses are purchased, and the application contacts a license manager or other key server to determine if the user can obtain a license to execute it. Floating licenses are not entirely unrestricted, but they may be adapted to much larger processing environments. For example, floating licenses might be restricted by the total number of licenses available, userIDs that can execute the software or IP Address ranges where the software is capable of running.

In a massively parallel processing (MPP) environment (such as is embodied by many "supercomputer" systems), applications are generally submitted via a scheduler and may run on many CPUs. For example, the application may execute using a few CPUs while testing, then tens of CPUs on one run, hundreds of CPUs the next time, and thousands of CPUs the next time, depending on the particular job being executed. In large MPP installations, it is impractical (for cost reasons) to use nodelock licensing, as each CPU in the MPP machine would have to be licensed, or applications would need to be restricted to a subset of CPUs where they could be executed. Based on the varying complexity of jobs, this is not a realistic restriction. Further, with a floating license model, there is the necessity that the application be able to contact the license server from each instance where it is running. In the situation where there are multiple compute elements (cores or CPUs) on a node, all using the same IP address, a network/floating license would have to license each compute element on the node.

Many MPP configurations keep individual CPUs on a private network to avoid latency and bottlenecks that occur due to name serving and a shared LAN. Therefore, a license server may not even be able to execute on an MPP system—leaving many applications with nowhere to authenticate its use. Without the ability to authenticate a license, many software applications cannot execute.

Possible workarounds to the multi-processor licensing problem include either eliminating the license restriction completely or purchasing licenses to cover every possible CPU that might operate in the computing system. However, the up-front cost of purchasing rights to unlimited software would be orders of magnitude higher to offset the loss of per-CPU licenses. Further, many software vendors do not allow licenses to be customized or reduced in price on the basis that the computer is "more powerful" or the software runs in a multi-processor setting. Techniques are needed for effectively managing the use and distribution of software licenses in a large processing environment, such as an MPP supercomputer configuration.

IBM® System Management Facility (SMF) is a component of IBM's z/OS for mainframe computers, providing a standardized method for writing out records of activity to a file (or data set to use a z/OS term). SMF provides full "instrumentation" of all baseline activities running on that mainframe operating system, including I/O, network activity, software usage, error conditions, processor utilization, etc.

One component of z/OS that uses SMF is the IBM® Resource Measurement Facility (RMF). RMF provides performance and usage instrumentation of resources such as processor, memory, disk, cache, workload, virtual storage, XCF, and Coupling Facility. RMF is technically a priced (extra cost) feature of z/OS. Software licensing (sometimes referred to as, "offerings") utilizes so called "container" pricing for a customer.

Turning now to an overview of the aspects of the invention, one or more embodiments of the invention address the above-described shortcomings of the prior art by providing a method for tracking and enabling software and computing resources in a customer environment. Additionally, the method and systems described herein provide an approach to report on utilization information by a software vendor. Embodiments enable interaction with a customer system, enablement of resources, and tracking of resource and software product usage.

Figure 4:
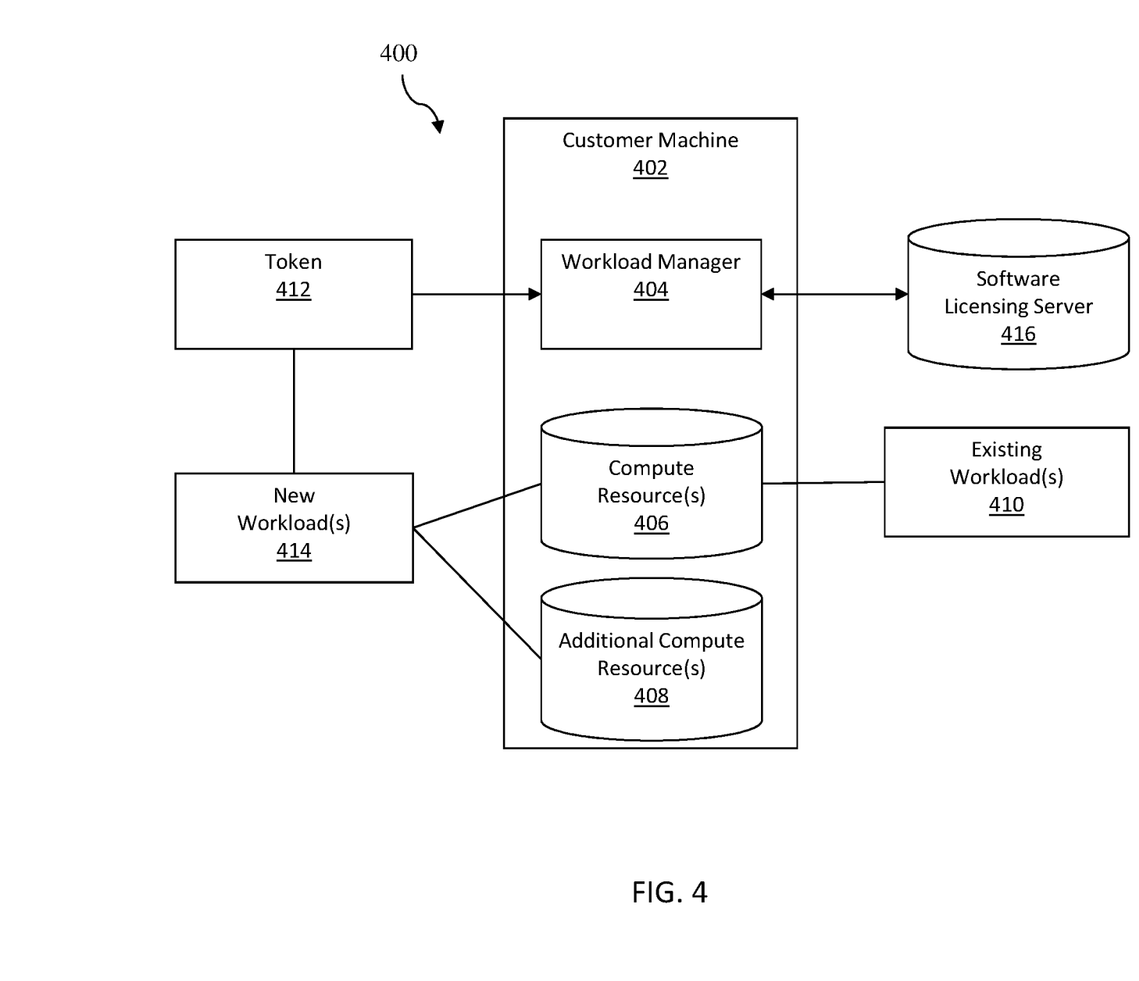
FIG. 4 depicts a system for tracking and enabling software and computing resources in a customer environment according to embodiments of the invention.

Turning now to a more detailed description of aspects of the present invention, FIG. 4 depicts a system for tracking and enabling software and computing resources in a customer environment according to embodiments of the invention. The system 400 includes a customer machine 402 which includes a workload manager 404, one or more computing resource(s) 406, and one or more additional computing resource(s) 408. The one or more computing resources 406 are utilized to support existing workload(s) 410 that are being operated by the customer machine 402. The one or more additional computing resource(s) 408 can include latent computing resources that may not be utilized for the existing workloads 410. A latent computing resource can be, for example, a processor or a processing core. The customer machine 402 can be any type of computer system such as, for example, a mainframe computer and/or server environment. As mentioned above, in a mainframe computer environment, software licensing includes license fees that are based on the actual computing usage of the software or the environment. The existing workloads 410 on the customer machine 402 utilize the one or more computing resources 406 and a software license bases the licensing fees on this usage. In one or more embodiments, the introduction of a new workload(s) 414 to the environment would affect the license fees because it would increase the actual computing usage of the customer machine 402. For example, assuming a server environment has 10 processing cores, but the peak usage for a time interval such as a month was the equivalent of 8 processing cores. The license fees would be calculated based on the 8 processing cores for each of the existing workloads 410 instead of the 10 cores. With the introduction of a new workload 414, the processing core usage may be increased to 10 cores which will affect the licensing fees of all the existing workloads 410 as well as the new workload 414.

In one or more embodiments of the present invention, a container based pricing model is utilized to address the issue of bringing on additional or new workloads to a customer machine 402. A container pricing model isolates the new workload(s) 414 from the customer environment and removes the computing resource consumption of a particular container from the entire environment. This allows for the existing workload(s) license fees to remain the same when a new workload 414 is introduced.

In one or more embodiments of the invention, the container pricing model described herein utilizes a token 412. The token 412 includes specific attributes to allow the workload manager 404 to track the computing resource consumption of the particular container pricing model and the new workload(s) 414. The token 412 will be associated with a particular workload or software solution such as the new workload 414 through the use of a workload profile. In one or more embodiments of the invention, the token 412 is generated along with a software license offering to a customer when the customer agrees to the offering. The token 412 includes characteristics that can be interpreted by the workload manager 404 on the customer machine 402. The workload manager 404 can communicate with the software licensing server 416 to authenticate the token 412. The software licensing server 416, based on the token 412, can provide information to the workload manager that defines the new workload 414 that is to be implemented and how to track the new workload 414 computing usage on the customer machine 402.

In one or more embodiments of the invention, the workload manager 404 and the software licensing servicer 416 can communicate indirectly through the use of a "middleman" reporting tool. The token 412 is created and the customer defines the new workload(s) 414 associated with the token 412.

In one or more embodiments of the present invention, a workload profile can be created by the workload manager 404. The workload manager 404 can analyze the new workload 414 to create the workload profile and also store the token 412 associated with the new workload(s) 414 in the workload profile.

In one or more embodiments of the present invention, the workload manager 404 tracks the computing resource(s) 406 usage for the new workload(s) 414 and reports this computing resource(s) 406 usage to the software licensing server 416. Based at least in part on the computing resource(s) 406 usage reporting, the software licensing server 416 can generate an invoice for a time period to be submitted to the customer. In one or more embodiments of the invention, the workload manager 404 utilizes a sub-capacity reporting tool (SCRT) which allows the workload manager 404 to generate sub-capacity reports for later pricing. The reports can be in any format including analysis of the computing resource usage in million service units (MSU). An MSU is a measurement of the amount of processing work a computer can perform in one hour.

In one or more embodiments of the invention, the workload manager 404 can analyze the computing resource usage for the new workload 414 to determine a need for additional computing resources 408. For example, the new workload 414 might not be running efficiently with the current computing resource(s) 406 and/or the new workload 414 might not be performed on schedule due to lack of processing power, etc. Based on determining that additional computing resources 408 are needed, the workload manager 404 can enable these additional computing resource 408 and associate this usage with the token 412 associated with the new workload 414. For example, a workload that is not meeting a SLA (service level agreement) due to the lack of available computing resources. The token 412 could be used to indicate that the approved offering includes the use of additional computing power (already in the physical machine but unpurchased—i.e. dark CPUs). In this case, the workload 414 can use the unpurchased capacity and "rent" it on a pay-as-you-go basis.

In one or more embodiments of the invention, the workload manager 404 and/or the customer machine 402 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

Figure 5:
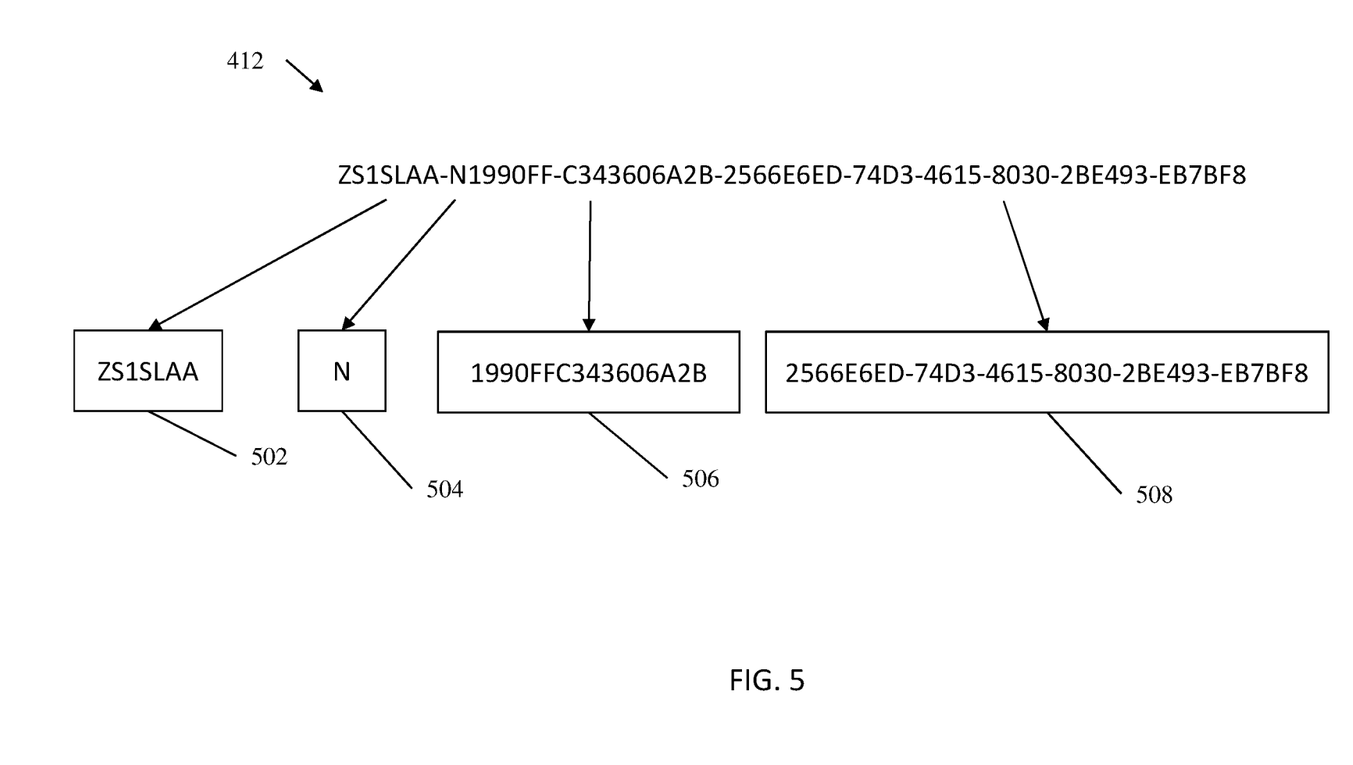
FIG. 5 depicts an example of a token according to one or more embodiments of the present invention.

FIG. 5 depicts an example of a token according to one or more embodiments of the present invention. The token 412 is a sixty-four character string which includes a header 502, a random letter 504, a hash 506, and a universally unique identifier (UUID) 508. In some embodiments of the invention, the token 412 is not cryptographically secure. Rather, the qualities of it are designed to allow simple validation and provide insurance against accidental use. Additionally, the header 502 informs interpreting programs about basic token 412 information that can help the tools understand characteristics such as the version of the token 412 (used to determine how to interpret the rest of the token), whether to enable additional compute resources, and the customer it is associated with. Also, the unique identifier 508 and random character 504 are used to ensure that the token is unique. The hash 506 provides a self-checking mechanism that allows the interpreting tool or software to determine whether the token 412 appears well-formed and valid. This assists in preventing accidental copy and paste errors and the like.

Figure 6:
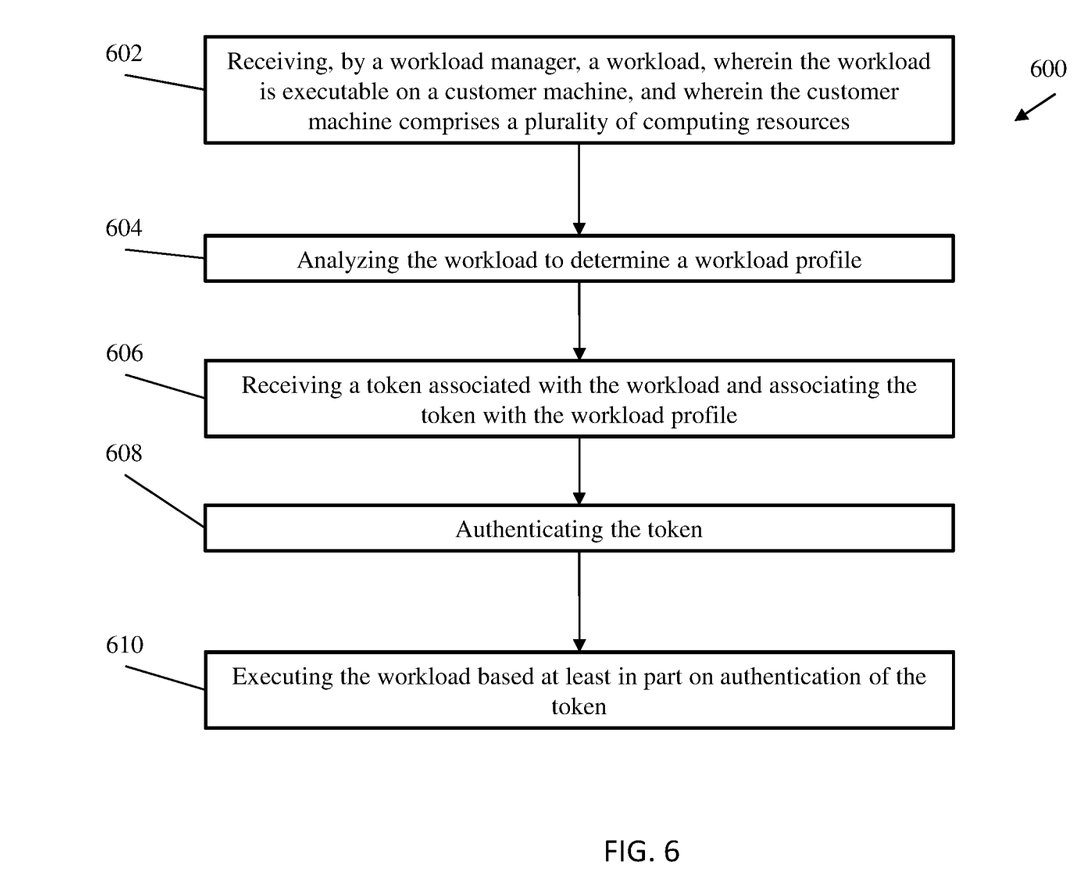
FIG. 6 depicts a flow diagram of a method for tracking computing resources according to one or more embodiments of the invention.

FIG. 6 depicts a flow diagram of a method for tracking computing resources according to one or more embodiments of the invention. The method 600 includes receiving, by a workload manager, a workload, wherein the workload is executable on a customer machine, and wherein the customer machine comprises a plurality of computing resources, as shown at block 602. At block 604, the method 600 includes analyzing the workload to determine a workload profile. The method 600, at block 606, includes receiving a token associated with the workload and associating the token with the workload profile. At block 608, the method 600 includes authenticating the token. And at block 610, the method 600 includes executing the workload based at least in part on authentication of the token.

Additional processes may also be included. It should be understood that the processes depicted in FIG. 6 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for tracking computing resources, the method comprising:
   receiving, by a workload manager, a workload, wherein the workload is executable on a customer machine, and wherein the customer machine comprises a plurality of computing resources;
   analyzing the workload to determine a workload profile;
   receiving a token associated with the workload and associating the token with the workload profile, wherein the token includes a string of characters comprising a header, a random letter, a hash, and a universally unique identifier (UUID);
   authenticating the token, wherein authenticating the token comprises analyzing the UUID to determine that the token is valid and performing a hash check; and
   executing the workload based at least in part on authentication of the token.

2. The computer-implemented method of claim 1, further comprising:
   periodically monitoring the workload to determine computing resource usage for the workload; and
   transmitting the computing resource usage for the workload to a software vendor.

3. The computer-implemented method of claim 2 further comprising:
   analyzing the computing resource usage for the workload;
   based at least in part on analyzing the computing resource usage, enabling at least one additional computing resource for the workload; and
   associating the at least one additional computing resource with the token.

4. The computer-implemented method of claim 1 further comprising:
   analyzing the workload profile to determine one or more computing resources of the plurality of computing resources required to execute the workload; and
   analyzing the token to determine that the workload is authorized to execute on the one or more computing resources.

5. The computer-implemented method of claim 1, wherein the token is associated with a software licensing offering associated with a customer.

6. The computer-implemented method of claim 1, wherein the plurality of computing resources comprises a processor.

7. A system for tracking computing resources, the system comprising:
a processor communicatively coupled to a memory, the processor configured to:
receive a workload, wherein the workload is executable on a customer machine, and wherein the customer machine comprises a plurality of computing resources;
analyze the workload to determine a workload profile;
receive a token associated with the workload and associating the token with the workload profile, wherein the token includes a string of characters comprising a header, a random letter, a hash, and a universally unique identifier (UUID;
authenticate the token, wherein authenticating the token comprises analyzing the UUID to determine that the token is valid and performing a hash check; and
execute the workload based at least in part on the token.

8. The system of claim 7, wherein the processor is further configured to:
periodically monitor the workload to determine computing resource usage for the workload; and
transmit the computing resource usage for the workload to a software vendor.

9. The system of claim 8 wherein the processor is further configured to:
analyze the computing resource usage for the workload;
based at least in part on analyzing the computing resource usage, enable at least one additional computing resource for the workload;
associate the at least one additional computing resource with the token.

10. The system of claim 7, wherein the processor is further configured to:
analyze the workload profile to determine one or more computing resources of the plurality of computing resources required to execute the workload; and
analyze the token to determine that the workload is authorized to execute on the one or more computing resources.

11. A computer program product for tracking computing resources comprising a computer readable storage medium having program instructions embodied therewith, where the program instructions are executable by a processor to cause the processor to perform a method comprising:
receiving, by a workload manager, a workload, wherein the workload is executable on a customer machine, and wherein the customer machine comprises a plurality of computing resources;
analyzing the workload to determine a workload profile;
receiving a token associated with the workload and associating the token with the workload profile, wherein the token includes a string of characters comprising a header, a random letter, a hash, and a universally unique identifier (UUID;
authenticating the token, wherein authenticating the token comprises analyzing the UUID to determine that the token is valid and performing a hash check; and
executing the workload based at least in part on the token.

12. The computer program product of claim 11, further comprising:
periodically monitoring the workload to determine computing resource usage for the workload; and
transmitting the computing resource usage for the workload to a software vendor.

13. The computer program product of claim 12 further comprising:
analyzing the computing resource usage for the workload;
based at least in part on analyzing the computing resource usage, enabling at least one additional computing resource for the workload;
associating the at least one additional computing resource with the token.

14. The computer program product of claim 11, further comprising:
analyzing the workload profile to determine one or more computing resources of the plurality of computing resources required to execute the workload; and
analyzing the token to determine that the workload is authorized to execute on the one or more computing resources.

* * * * *